Feb. 22, 1966   H. W. CHRISTENSON   3,236,117
AUTOMATIC TRANSMISSION FOR AUTOMOTIVE VEHICLE
Original Filed Nov. 8, 1954                4 Sheets-Sheet 3
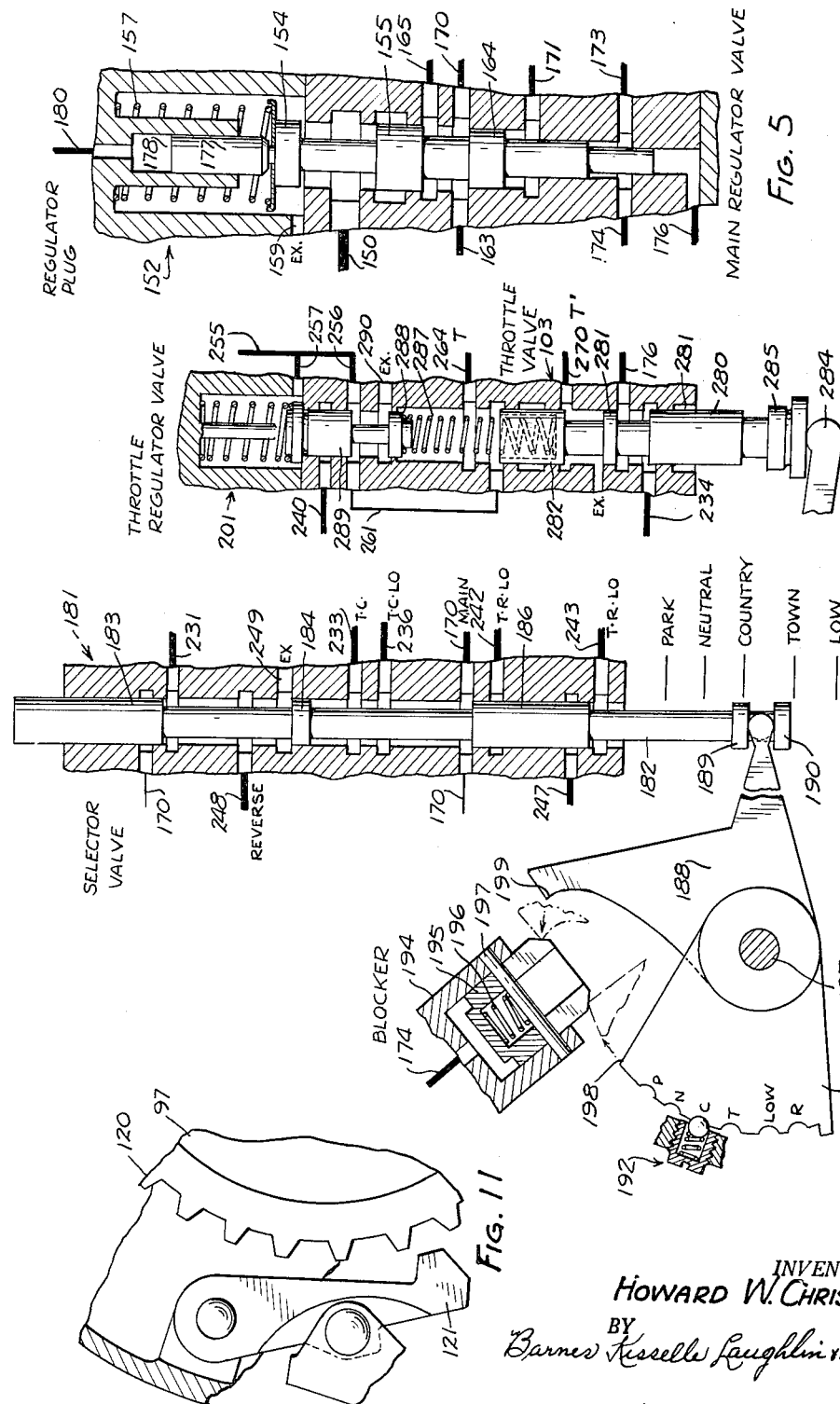
INVENTOR.
HOWARD W. CHRISTENSON
BY
Barnes, Kisselle, Laughlin & Raisch
ATTORNEYS.

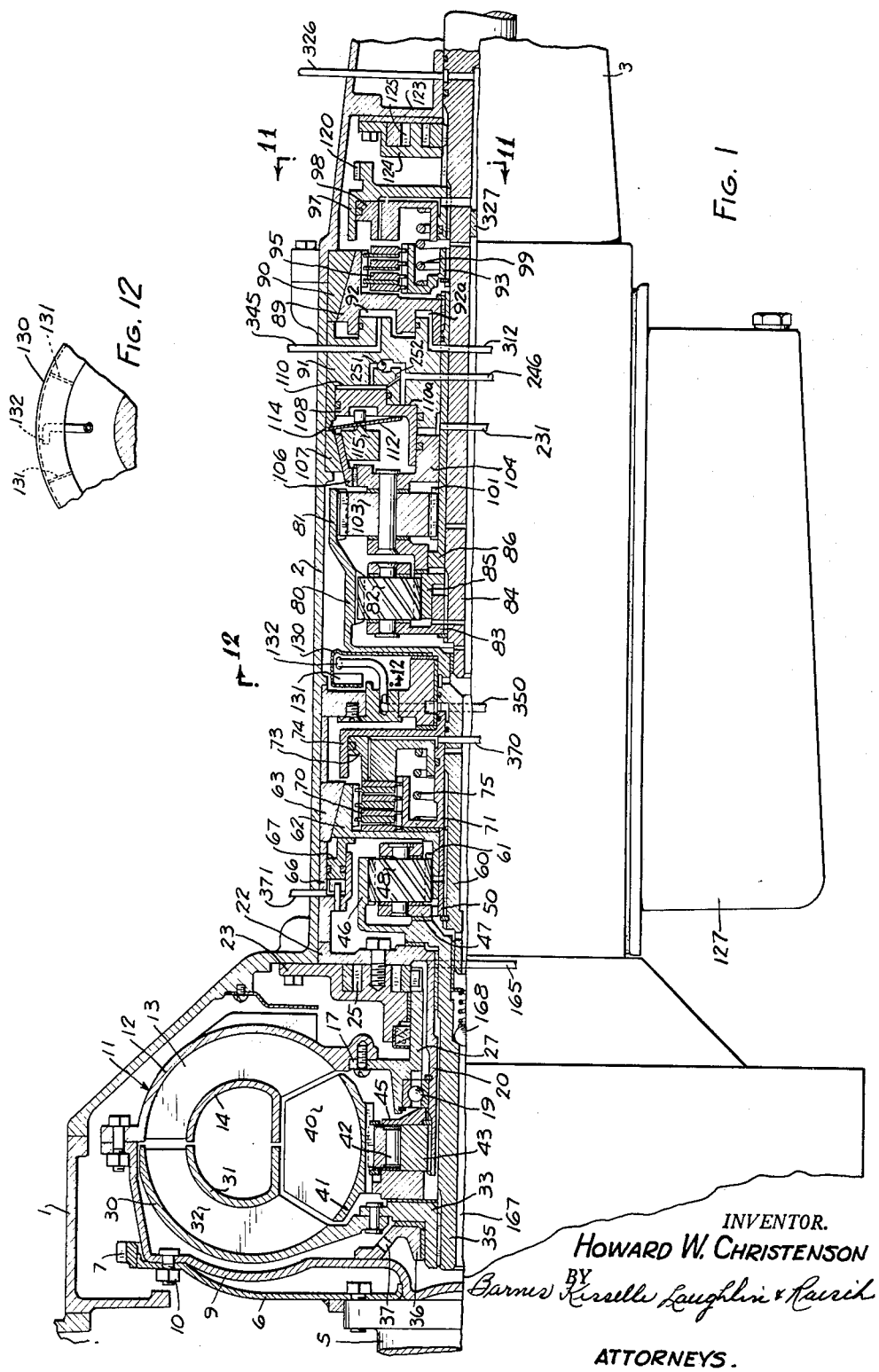

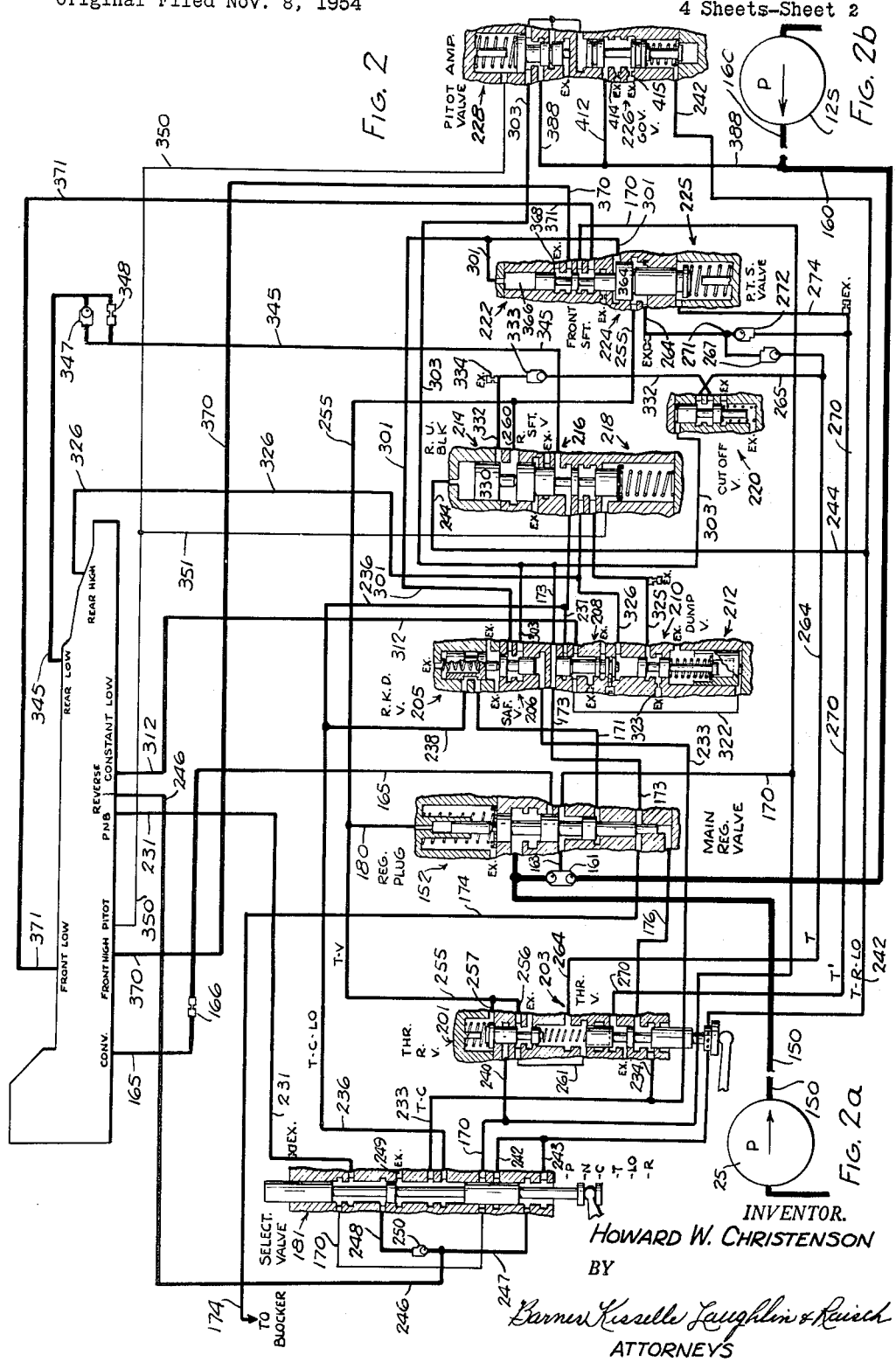

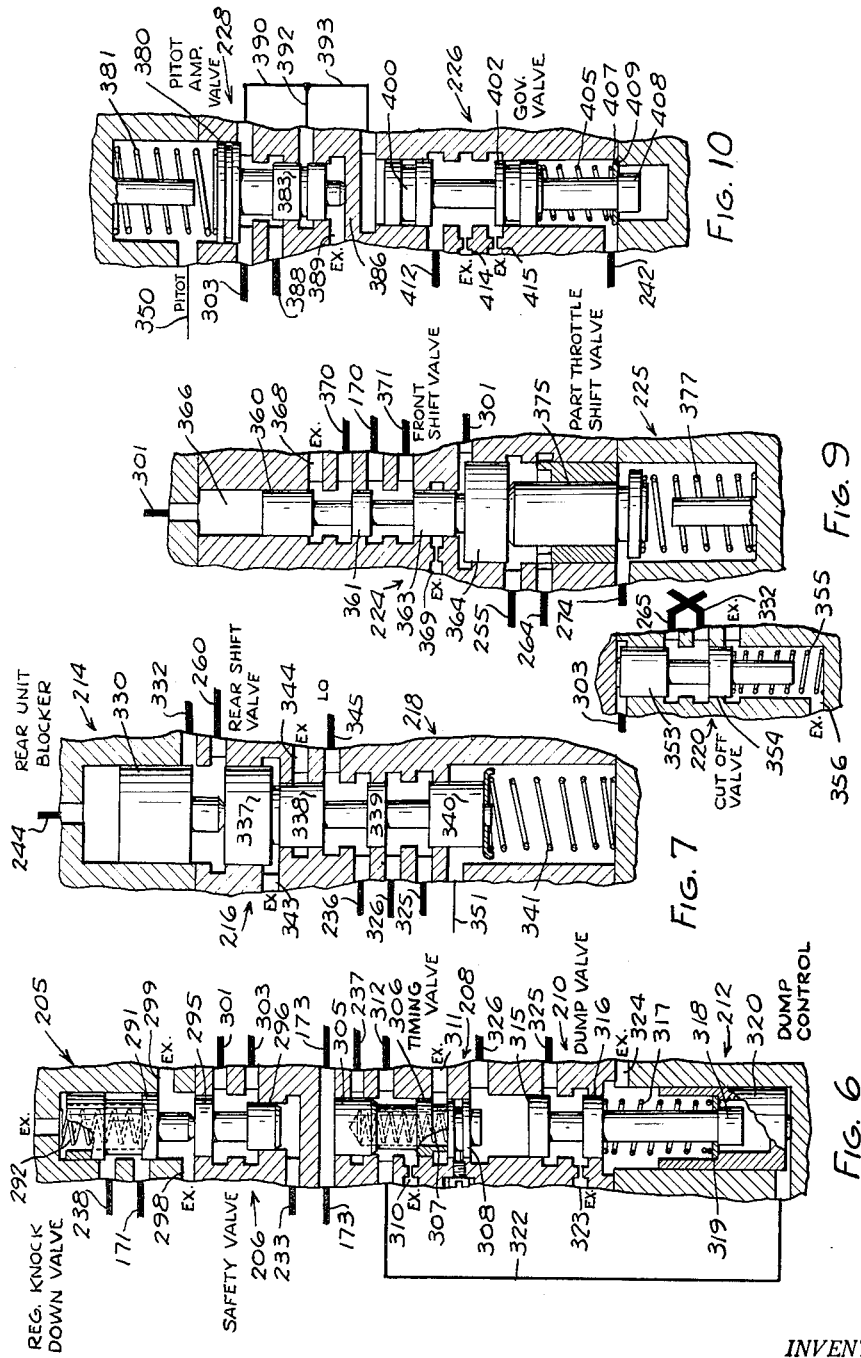

United States Patent Office 3,236,117
Patented Feb. 22, 1966

3,236,117
AUTOMATIC TRANSMISSION FOR
AUTOMOTIVE VEHICLE
Howard W. Christenson, Indianapolis, Ind., assignor to
General Motors Corporation, Detroit, Mich., a corporation of Delaware
Continuation of application Ser. No. 467,277, Nov. 8,
1954. This application Sept. 10, 1958, Ser. No. 761,664
53 Claims. (Cl. 74—472)

This application is a continuation of application S.N. 467,277, filed November 8, 1954, now abandoned.

This invention relates to an automatic transmission and it has to do particularly with a transmission intended primarily to transmit the torque from an internal combustion engine to the driving wheels of an automotive vehicle. The invention and some features of the transmission may, of course, be employed for the transmission of torque other than in automotive vehicles.

There are a number of objects of the invention included among which is the provision of a torque transmitting mechanism which can be constructed as a relatively small compact unit, relative, of course, to the size and power of the engine and size of the vehicle with which it is to be used and torque transmission requirements.

Further, it is an object to provide a transmission which has two ranges of operation, providing two ratios each, thus giving the transmission four torque transmitting ratios overall. One range of operation may be considered a "country" range wherein the two ratios are relatively high; another range may be considered a "town" range where the two ratios are relatively low. These ratios refer to mechanical gearing in the transmission. However, the gearing part of the transmission is combined with a fluid torque converter, which, in itself, varies the ratio under certain conditions.

A further object of the invention is to provide a control arrangement wherein an operator may exert what may be termed an "overcontrol" and may, as elected, exert the overcontrol to cause either a single or a double downshift of gear ratios in the transmission. In this connection the mechanical part of the transmission embodies two planetary gear sets, each capable of being conditioned to transmit torque at different ratios, and the operator may cause a downshift either in one planetary or in both to thus meet conditions on the highway. A further feature is to provide for what is termed a part throttle downshift in that the operator may cause a shift in the ratio of the transmission by only a part throttle actuation; by this is meant that the throttle does not need to be completely depressed to the full limit of its movement to effect a part throttle downshift.

A still further feature is to provide a safety control. When the transmission is conditioned for the transmission of torque at its lowest ratio, this control effects an upshift of the transmission in the event of excessive engine speeds.

The invention embodies a control to minimize or to prevent the tendency of the vehicle to creep when it is in a standing position with the throttle closed and the engine idling. Under these conditions, and as is known to those versed in the art, a hydraulic torque converter transmits light torque to the traction wheels causing the creeping action. In accordance with this invention, the mechanical part of the transmisison is automatically placed in its highest ratio and thus the torque exerted by the idling engine through the torque converter is not adequate to cause vehicle creep.

Still another object is to provide a control for the transmission which is governed by pressure which varies with vehicle speed. Since a shift in ratio in the low range or town condition should be made at lower vehicle speeds than the shift in ratio when operating in the high or country range, the control provides for a lower speed controlling pressure schedule when the transmission is operating in town range than when it is operating in country range.

The planetary gear sets are each arranged to be controlled by friction devices such as a clutch and a brake. The clutch, for example, inter-engages certain elements of the planetary unit so that the members thereof rotate in unison and transmit torque at 1:1 ratio; the brake, for example, engages an element of the planetary gearing to ground and thus holds it stationary to transmit torque at an increased ratio. The clutch and brake are arranged to cooperate with each other so that one takes the reaction of the other and in making the change between clutch engagement and brake disengagement and vice versa, there is a self-timing arrangement resulting in no hiatus or time interval between the engagement of one and disengagement of the other. Thus a smooth shift from one condition to the other is obtained. Moreover, one of the controlling friction devices, such as the brake in this instance, is self-energizing and this is accomplished by utilizing the axial thrust placed on a member thereof incident to the transmission of torque through gearing with helical teeth. This self-energizing feature aids in the self-timing relationship. The brake of one planetary unit may be completely self-energizing, capable of complete engagement for the transmission of torque in the absence of engaging pressure otherwise provided. The brake of the other planetary unit which functions in a lower range may be only partially self-energizing.

Other objects will appear as the detailed description is considered in connection with the accompanying drawings.

The drawings show a transmission and a hydraulic system constructed in accordance with the invention.

FIG. 1 is a general cross sectional view illustrating the mechanism of the transmission including the fluid torque converter and the gear sections.

FIG. 2 is a diagrammatic view of the hydraulic control system illustrating the valves, a representation of the transmission casing and the conduit lines.

FIG. 2a is a diagrammatic representation of the front pump for the hydraulic medium.

FIG. 2b is a diagrammatic illustration of the rear pump for the hydraulic medium.

FIG. 3 is an enlarged cross sectional veiw of the manually controlled selector valve and the operator therefor.

FIG. 4 is an enlarged sectional view of the throttle valve and throttle regulator valve.

FIG. 5 is an enlarged sectional view of the main regulator valve.

FIG. 6 is an enlarged sectional view of valves including a regulator knock-down valve, a safety valve, a timing valve, a dump valve and dump control plug.

FIG. 7 is an enlarged cross sectional view of a shift valve and a rear unit blocker.

FIG. 8 is an enlarged cross sectional view of a cut off valve.

FIG. 9 is a cross sectional view of a shift valve and part throttle shift valve.

FIG. 10 is an enlarged cross sectional view of a governor valve and a Pitot tube amplifier valve.

FIG. 11 is an enlarged partial cross sectional view taken on line 11—11 of FIG. 1 illustrating a parking device.

FIG. 12 is a detail view illustrating the Pitot tube taken on line 12—12 of FIG. 1.

THE GEARING

The transmission shown in FIG. 1 is one adapted for use with an automotive vehicle and it has a casing with an enlarged part 1 for connection to the body or block of the engine, a smaller extending part 2, and a terminal part 3. The crank shaft of the engine is illustrated at 5 and connected thereto is a plate or flywheel 6 which may have on its periphery teeth of a starter gear 7.

A rotary fluid torque converter is associated with the flywheel 6 to receive the torque of the engine. It has a forward enclosing plate 9 connected to the member 6, as at 10, and an impeller or pump, generally illustrated at 11, and having an outer wall 12, blades 13 and a core 14. Secured to the inner part of the pump, and constituting a part thereof, is a member 17, journalled on a bearing 19 for taking axial thrust. The bearing is mounted on a ground sleeve 20 which has a flange 22 which forms part of a pump housing. A member 23 completes the pump housing and the pump elements are illustrated at 25. The inner pump element is driven by the sleeve portion 27 of the member 17. Thus, the shaft of the engine drives the pump or impeller 11 of the torque converter and the pump 25.

The turbine or driven member of the torque converter has an outer wall 30, a core portion 31 and blades 32. The turbine has a hub portion 33 keyed or splined to a shaft 35. There is a pilot bearing for the hub 33 and the forward end of the shaft 35 which is disposed in a member 36 which is secured to the forward plate 9, and which is provided with a number of openings as indicated at 37.

The stator of the torque converter has blades 40 and an outer wall 41. The stator is mounted on the ground sleeve 20 through the means of an overrunning or one-way brake shown herein as embodying rollers 42 with an inner race 43 splined or keyed to the ground sleeve. A thrust element 45 is positioned between the inner race of the thrust bearing 19 and the one-way coupling 42.

It will thus be seen that the impeller, turbine, and stator cooperate to form a torus chamber designed to be maintained full of liquid under pressure. When the impeller is caused to rotate the liquid in the torus chamber moves counterclockwise therethrough as FIG. 1 is viewed, and impinges on the blades 32 of the turbine delivering torque thereto. The blades of the stator redirect the liquid as it passes from the turbine to the impeller so that the torque is multiplied. As is known to those versed in the art, when the stator blades function to redirect the liquid, or oil as it may more conveniently be called, the stator is held stationary as it cannot rotate reversely because of the one-way brake 42. As the speed increases, however, the stator blades ultimately perform no redirecting function of the oil so that it may rotate freely forwardly. The one-way coupling 42 is called a brake since it connects the stator to a stationary element, this term being used to comply with the terminology customarily required in cases of this kind. Also this term is used in this sense for certain friction engaging devices in the gearing.

The gearing comprises essentially two sections, each having epicyclic gears therein more commonly referred to as planetary gears. In the front section the ring gear 46 is formed as a part of the shaft 35; the carrier 47, with a plurality of planet gears 48 thereon, has a hub portion 50 splined or keyed to the shaft 60. The sun gear 61 is journalled on the hub 60 and is formed as a part of a cone-shaped brake member 62 which cooperates with an internally coned brake member 63 carried by the housing. The member 62 may be steel and the member 63 may be bronze or other similar alloy. A piston 65 of annular form is arranged to act upon the brake member 62 and it is disposed in a cylinder 66. There is a clutch shown as being of the multiple disc type and generally indicated at 70 disposed between the member 62 and a member 71 keyed or splined to the shaft 60. This clutch is actuated by a piston 73 disposed in a cylinder 74 and a coil spring 75 acts upon the piston 73 and reacts on the member 71.

The teeth of the gears 46, 48 and 61 are of the helical type. As a result, when they are subjected to load an axial thrust is placed upon the sun gear 61 and the cone brake member 62. The arrangement is such that when the gears are subjected to load by forward driving torque the sun gear and cone brake member are shifted to the right as FIG. 1 is viewed, to cause the cone brake member 62 to engage the brake member 63. A preferred arrangement is that this brake is 100% self-energizing in this sense. This influences the operation of the gear set as will later be seen. The piston 65 functions to insure engagement of the brake and to hold it engaged under all conditions where engagement is desired. An advantageous arrangement is where the helical angle of the gear teeth is about 38°, and the angularity of the cone brake surfaces are about 8°.

When the cone member 62 is engaged with the brake member 63 the cone member 62 and the sun gear 61 are held stationary. Therefore, the ring gear 46 will drive the carrier 47 and shaft 60 in the same direction of rotation as the ring gear 46 but at a lower speed. If the piston 73 is urged to the left, as by the introduction of hydraulic medium in the cylinder 74, the clutch 70 is engaged. This interengages the sun gear 61, the shaft 60 and the carrier 47 so that they must rotate in unison. Therefore, the ring gear 46 drives the shaft 60 through the pinions 48, without rotation of the pinions about their respective axes, in the same direction and at the same speed.

At this point it is to be noted that the number 62 is urged in one direction for application of the cone brake and is urged in the opposite direction for the application of the disc clutch. The member 62 is slidable on the shaft 60 and it takes the reaction for engaging the clutch 70. Accordingly, when the clutch 70 is to be engaged by application of hydraulic medium in the cylinder 74, the member 62 is shifted to the left and thus the cone brake is positively disengaged.

The rear gear section is shown as having two ring gears 80 and 81 formed as a part of the shaft 60. The shaft 60 is the output member for the front section and the input member for the rear section. The ring gear 80 is associated with planet gears 82 on a carrier 83 splined or keyed to a final output shaft 84. The sun gear 85 has a sleeve 86, the rear end of which is connected to a cone brake member 89, which may be steel, cooperating with an internally coned brake member 90 which may be bronze. The brake member 89 is axially shiftable and it cooperates with a member 91 to provide a cylinder 92. Situated between the member 89 and a member 93 which is keyed or splined to the shaft 84 is a clutch, shown as a multiple disc clutch 95. A cylinder member 97 is mounted on the shaft 84 and in it is a piston 98 operable on the clutch 95. A coil spring 99 keeps the piston retracted in its cylinder. If the brake 89–90 is engaged the brake member 89, sleeve 86 and sun gear 85 are grounded, so to speak, and thus held stationary. At this time the ring gear 80 drives the carrier 83 and the shaft 84 in the same direction but at a lower speed than the ring gear 80, while the planet gears 82 rotate on their axes and revolve, around the stationary sun gear. If hydraulic medium be introduced into the cylinder 97, engaging the clutch 95, the sun gear 85 and the shaft 84 are thus clutched together and must rotate in unison. The ring gear 80, under these circumstances, drives the shaft 84 at the same speed, through the planet gears 81 which cannot rotate. The brake member 89 takes the reaction for the engagement of the clutch 95 and in doing so it is urged to the left as FIG. 1 is viewed, and the brake engagement between the cone element 89 and the brake element 90 is thus positively disengaged. The reaction of brake 89–90 is self-energizing due to the helical teeth but to a lesser extent because of the greater ratios and higher torques involved. The helical angle of the gear teeth and of the cone surfaces may be the same as those of the front planetary gear set and brake.

The ring gear 81 is for reverse. It is associated with a sun gear 101 mounted on sleeve 86. Planet gears 103 are journalled in a carrier 104. The carrier has a cone-shaped brake member 106, which may be steel, cooperating with an internally coned ground brake member 107 which may be bronze. A piston 108 in a cylinder 110 in member 91 acts upon the brake 106–107 preferably through means of a spring annulus known as a Belleville washer or Belleville spring 112. The outer peripheral edge of the spring is fulcrumed against the member 91 as at 114. The inner peripheral edge is engaged by the piston 108, and the spring engages a shiftable cone member 115 which may be bronze. If the piston 108 be shifted to the left by the introduction of hydraulic medium into the cylinder 110, the cone member 106 is engaged between the brake member 107 and member 115. It will be noted that the piston 108 has two diameters or two portions thus forming a secondary cylinder 110a which will be considered later. The cone brake 106–107 is not self-energizing as the member 106 is slidably keyed or splined to the carrier 104. The engagement of this brake is made adequate because of the leverage advantage afforded by the Belleville washer.

If the brake 106–107 is applied, the carrier 104 is grounded and held stationary. Thus the sun gear 101 and its sleeve 86 are operated in the reverse direction. Similarly sun gear 85 operates in the reverse direction. And due to the fact that the ring gear 80 is smaller than the ring gear 81, that is, being of smaller diameter and therefore having fewer teeth, and the sun gear 101 is smaller than the sun gear 85, the net result is that the carrier 83 is operated in the reverse direction thus turning the output shaft 84 in the reverse direction.

The cylinder member 97 may be provided with a toothed portion 120 arranged to be engaged by a latch or detent 121 when the vehicle is parked (FIG. 11). This locks the output shaft 84 and the driving wheels of the vehicle against rotation. The detent may be manually controlled by means not shown.

There is a rear pump for hydraulic medium having a pump housing constituted by a portion 123 of the housing and a housing member 124 the pump elements being generally illustrated at 125 and driven by the output shaft 84. The underside of the casing 2 of the transmission may be provided with a suitable sump 127 for hydraulic medium. There is a Pitot tube arrangement for applying controlling pressure and this is shown as being in the form of a shell 130 attached to and rotatable with the ring gear 80. Oil is accumulated in the shell and forms a rotating ring of oil held outwardly in the shell by centrifugal force. Rotation of the body of oil in the shell is facilitated by blades 131. A Pitot tube 132 is positioned in the shell with its open end facing upstream relative to the direction of rotation of the body of oil in the shell (FIG. 12). Thus the velocity head is impressed on the oil in the Pitot system and this is employed as a controlling factor responsive to speed.

The cone brake members 62 and 89, which provide reaction for establishing the low ratios, may be of steel and thus the steel surfaces thereof engage the internally coned brake members 63 and 90. In order to provide a desirable co-efficient of friction, the cone surfaces of the members 62 and 90 may be traversed by grooves formed therein. An advantageous arrangement is that of having crossing grooves so that the surfaces are, in effect, knurled.

A general description of the operation of the mechanism thus far described would seem to be in order before describing the hydraulic control and the various automatic features. In doing this, gear ratios will be referred to but it is to be understood that these particular ratios are exemplary only and that the transmission may be designed for obtaining other ratios.

It will be noted that the transmission embodies two planetary gear units for forward driving, namely, the front unit embodying the ring gear 46, pinions 48, sun gear 61, and the rear unit embodying ring gear 80, pinions 82, and sun gear 85. With this arrangement, the transmission actually provides four speeds forward but it is to be controlled so that the normal forward driving is in two ranges of two gear ratios each. There is a low range which may be considered as the town range and a high range which may be considered a country range.

Low or town range: In this range the rear unit remains in reduction with the brake 89–90 engaged. This reduction may be 1.5:1. In the low ratio of this range the brake 62–63 of the front unit is engaged; this may give a reduction, say of 1.4:1. The overall reduction is thus about 2.10:1. The vehicle may be started in this low ratio and at a proper time, that is, under proper conditions of speed and torque, the brake 62–63 is released, the clutch 70 engaged, and thus the front unit is shifted into high ratio. The transmission now transmits torque at a 1:1 ratio through the front unit and 1.5:1 through the rear unit. The operator may selectively set a control valve to maintain operation in this low or town range.

High range or country range: In this range the operator makes his selection to engage clutch 95 and release the brake 89–90 and thus the rear unit is conditioned to transmit torque at 1:1 ratio. At the start, the front unit has the brake 62–63 engaged and thus torque is transmitted therethrough at 1.4:1 ratio. Under proper torque and speed conditions, the brake 62–63 releases, the clutch 70 engages and the front unit transmits torque at 1:1 ratio and since the rear unit is conditioned to transmit torque at 1:1 ratio, the overall ratio through the gearing is 1:1.

The torque converter: Of course, the above ratios refer only to the condition in the gearing. The torque converter being forward of the gearing varies the ratio between the engine crankshaft and the shaft 35 and its ring gear 46. Accordingly, the particular gear ratio in the gearing is multiplied by that provided by the troque converter.

Low lockup: The operator may, by proper selection of control, condition the transmission so that both front and rear units remain in their respective low ratios.

Reverse: As heretofore explained, the operator, by suitable control may cause engagement of the brake 106–107 which holds the carrier 104 stationary thus driving sleeve 86 reversely and sun gear 85 reversely which, in conjunction with the ring gear 80, and pinions 81, drive the carrier 83 and the output shaft 84 into reverse direction. This may be an overall reduction of 2.8:1.

Neutral: In neutral condition the front planetary unit may be in reduction and the rear unit in neutral.

Parking condition: In parking condition, available only at very low vehicle speeds, the front unit may be in reduction and the rear unit always is in neutral, and, furthermore, when parking, the detent 121 may be engaged with the teeth 120 of the member 97 to thus hold the traction wheels against turning.

HYDRAULIC CONTROL SYSTEM

The various conduits of a hydraulic system as shown in FIG. 2 as single lines, and some lines are shown relatively heavy and some relatively light to aid in differentiating between them. Moreover, with the view of simplifying the disclosure, and economizing on reference characters wherever feasible, a port in a valve body can be considered as a part of a conduit and the reference character applied to the conduit may be considered as also applying to the port to which it connects since the port is actually a part of the conduit.

There are a number of valve devices in the hydraulic system each generally illustrated by a reference character as follows: There is a main regulator valve 152, selector valve 181, and a throttle regulator valve 201, a throttle valve 203 (FIG. 4), a regulator knock-down valve 205, a safety valve 206, a timing valve 208, dump valve 210, a dump control plug 212 (FIG. 6), a rear unit blocker plug 214, a rear unit shift valve 216, a Pitot actuated member 218 (FIG. 7). There is a cut-off valve 220 (FIG. 8), a front shift valve 224 and a part throttle down-shift plug 225 (FIG. 9). A governor valve is shown at 226 and a Pitot amplifier valve at 228 (FIG. 10).

Main regulator valve

A pressure line 150 extends from the front pump to the main pressure regulator valve generally illustrated at 152 (FIGS. 2 and 5). It enters between lands 154 and 155 of the movable valve member which is spring loaded by a spring 157. In FIG. 5 the valve member is shown in an operating position, elevated against the action of the spring so that some of the oil may be discharged from the exhaust port 159.

A pressure line 160 leads from the rear pump 125 and a double check valve 161 is interposed between line 150 and line 160. Pressure lines 150 and 160 connect into the regulator valve through line 163 between lands 155 and 164. Thus, both pumps may deliver oil under pressure to the main regulator valve but are not in communication with each other because of the check valve arrangement. A line 165 leads from the regulator valve to the converter. This line has a suitable restriction 166 therein. As shown in FIG. 1 the line 165 leads into the clearance between the hub portion 27 and the ground sleeve 20 thence through the thrust bearing 19 into the space to the right of the one-way coupling 42 and thence into the torus chamber. A flow of oil is maintained through the torus chamber and some escapes through the clearance between the impeller and the turbine, passes through the clearance between the turbine wall 30 and the plate 9, through apertures 37 and into the hollow 167 of the shaft 35. A relief valve in the form of a spring pressed ball 168 maintains the requisite pressure in the torus chamber. When the oil passes the ball, it is discharged into a lubrication line and then to the sump.

Another line 170 connects into the regulator valve between lands 155 and 164, and as will later be seen, this line connects into the selector valve 181 and the front shift valve 224. A line 171 connects into the main regulator valve below the land 164 and its leads to the regulator knock-down valve 205. A line 173 connects into the main regulator valve and connects into other lines will extend to the cut-off valve 220, the front unit shift 206, and to the Pitot amplifier valve 228. A line 174 extends from the regulator valve to a blocker element for controlling movements of the selector valve (FIG. 3). Lines 173 and 174 can be considered as one line, but it appears convenient to use the two referred characters on the different parts thereof. Also connecting into the regulator valve 152 is a line 176 which leads to the throttle valve 203.

Associated with the pressure regulator valve is a regulator plug or piston 177 mounted in a cylinder construction 178 into which leads a line 180. Introduction of hydraulic medium through line 180 produces a force on piston 177 to influence the main regulator valve in certain operations of the mechanism.

Selector valve

The manually controlled selector valve 181 has a movable valve member 182 with a land 183, a land 184, and a land 186. The movable member can be shifted to any one of six positions as indicated by the notations, park, neutral, country, town, low and reverse. This may be done by a rockable shaft 187 with an arm 188 having a part disposed between abutments 189 and 190 and a notched segment 191 movable in unison therewith holds the selector valve in selected position as by means of a detent 192 shown as in the form of a spring pressed ball.

There is a blocker including a housing 194 with a spring pressed piston 195 therein, the spring 196 being disposed within the piston and reacting against a pin 197. When hydraulic medium enters the housing from line 174 and is great enough to overcome spring 197, the piston is projected against the action of the spring and it takes a position to be engaged by the portion 198 of the segment or the portion 199 of the arm. When the detent is in the neutral notch marked N, the segment and arm cannot be moved counterclockwise to the park position if the piston 195 is projected, as the portion 199 strikes the piston as shown in dotted lines. Also, if the valve is in low position the detent is in the low notch. Therefore, the valve cannot be moved to reverse position if the piston is projected because the portion 198 of the segment strikes the piston as shown by the dotted lines.

The selector valve is shown in the high range or country position in FIG. 3, whereas it is shown in the neutral position in FIG. 2.

A conduit line 231 connects into the selector valve between the lands 183 and 184, in the position shown in FIG. 3, and extends into the area between the carrier 104 and member 91 (FIG. 1). A line 233 connects into the selector valve between lands 184 and 186 and extends to safety valve 206 and it has a branch 234 which extends to the throttle valve 203. A line 236 also connects into the selector valve; it has a branch 238 which extends to the knock-down valve 205 while the line 236 continues and connects to the rear shift valve 216 with a branch thereof 237 connecting into the timing valve 208.

The heretofore described line 170 extending from the main regulator valve 152 passes through the selector valve and enters the selector valve 181 adjacent the land 183. A branch of line 170 is indicated at 240 and enters the throttle regulator valve 201.

A line 242 extends from the selector valve and enters the back side of the governor valve 226 (FIG. 10). A branch 243 enters the selector valve below the land 186; another branch 244 enters the rear unit blocker 214. A line 246 has a branch 247 which enters the selector valve below the land 186 and a branch 248 which enters the selector valve between lands 183 and 184. The line 246 extends to the cylinder 110 (FIG. 1). The line 248 has a check valve 250 therein. The line 246 has a direct connection with the cylinder 110a (FIG. 1), while there is a check valve 251 in the line leading to the cylinder 110. The line 246 also connects into the cylinder 110 through a relatively small bleed port 252.

Throttle regulator valve and throttle valve

A line 255 connects into the throttle regulator valve 201 as at 256 and 257. This line connects into line 180 which leads to the regulator plug 152; it connects into the rear unit shift valve through line 260 and connects into the front shift valve 224 (FIGS. 2 and 9). There is a line 261 which forms an interconnection between the throttle regulator valve 201 and the throttle valve 203 (FIG. 4). A line 264 connects into the throttle valve 203; a branch 265 thereof connects into the cut-off valve 220, a check valve 267 is disposed in line 264 and the line continues and connects into the front shift valve 224 (FIG. 9).

A line 270 connects into the throttle valve 203 and connects into the line 264 at 271 with an interposed check valve 272. Line 270 has branch 274 which also connects into the part throttle shift valve 225.

The throttle valve 203 has a movable member with a land 280, a land 281, and a land 282 is arranged to be acted upon by an actuating element 284 which is part of the manually operated engine throttle linkage. It also has a land 285 arranged to move into a recess 283 in the body of the valve to provide a detent action to the movement of the throttle.

A spring 287 is interposed between the throttle valve 203 and movable member of the throttle regulator valve 201. The throttle regulator valve has a land 288 and a land 289. The throttle regulator valve has an exhaust port 290. The lines 264 and 274 which are connected to line 270 have restricted exhausts as shown in FIG. 2.

Regulator knock-down valve

The regulator knock-down valve 205 has a movable member with a land 291 acted upon by a spring 292; lines 238 and 171 connect into it as shown.

The movable element of the regulator knock-down valve acts upon a safety valve, the movable element of which has a land 295 and a land 296. Associated with the knock-down valve 205 and safety valve 206 is an exhaust port 298 and an exhaust port 299. The knock-down regulator valve member acts upon the safety valve member. A line 301 connects into the safety valve and into the upper end of the front unit shift valve (FIG. 9). A line 303 extends from the safety valve and connects into the Pitot amplifier valve (FIG. 10). A branch of the line 303 also enters the cut-off valve; connecting into the line 303 is the line 173; this line, as aforesaid, enters the main regulator valve. Line 173 passes through the timing valve 208 and acts on the land 305 thereof (FIG. 6). The movable element of the timing valve has a land 306 and it is acted upon by a spring 307 which reacts against a fixed element 308. The timing valve has a restricted exhaust 310 and an exhaust port 311. The head 305 controls the connection with a line 312 which extends to a cylinder portion 92a of the cone brake 89–90 (FIG. 1).

Dump valve

The dump valve (FIG. 6) has a movable element with a land 315, a land 316, and it is acted upon by a coil spring 317. The dump valve member has a stem with a head 318 which underlies a washer 319; the washer seats on an internal shoulder of a piston 320 which constitutes a dump control. A line 322 interconnects the timing valve and the dump control chamber. The dump valve has an ensmalled exhaust 323 and an exhaust 324. A line 325 having a restricted exhaust (FIG. 2) connects into the dump valve and extends to the rear shift valve 216 (FIG. 7).

Connecting into the dump valve above the head 315 is a line 326 which connects into the rear shift valve 216 (FIG. 7). This line 326 (FIGS. 1 and 2) extends to the cylinder 97 passing through a bore in the shaft 84 which bore is blocked as at 327.

Rear unit blocker and rear shift valve

A rear blocker unit (FIG. 7) has a movable element 330 movable in a chamber having a closed end into which line 244 connects. Lines 332 and 260 are connected into the chamber between valve element 330 and land 337 of the rear unit shift valve. Line 332 is connected to the cut-off valve (FIG. 8). In line 332 is a check valve 333 as well as a restricted exhaust 334. The rear shift valve has a body and a movable element thereof has a land 337, a land 338, a land 339, and a land 340, and it is acted upon by a spring 341. There is an exhaust 343 and an exhaust 344. Connecting into the rear shift valve is a line 345 which extends to the cylinder 92 (FIG. 1). In the line 345 is a check valve 347 and a restricted passage 348 (FIG. 2). Leading from the Pitot tube is a line 350 (FIG. 1) and it has a branch 351 which connects into the rear shift valve so that the pressure thereof acts on the under side of the valve member as FIG. 7 is viewed. The Pitot pressure line 350 continues and enters the Pitot amplifying valve as indicated at FIG. 10.

Cut-off valve

The cut-off valve 220 (FIG. 8) has a movable element with a land 353, a land 354, and it is acted upon by a spring 355 and the body has an exhaust port 356. The lines connecting into the cut-off valve have already been described and are indicated in FIG. 8.

The front shift valve

This valve structure is shown in FIG. 9 and the movable element has a land 360, a land 361, a land 363, and a land 364. The line 301 connects into a chamber 366 to act upon the land 360. There is an exhaust 368 and a restricted exhaust 369. The line 170 enters between the lands 361 and 363 in the position of the valve shown in FIG. 9. A line 370 connects into the shift valve and to the cylinder 74 (FIG. 1). Also a line 371 connects into the shift valve and extends to the cylinder 66 (FIG. 1).

Part throttle shift valve

The part throttle shift valve has a movable valve member 375 which acts upon the front shift valve member; the valve member 375 is spring pressed by the coil spring 377 and the heretofore described conduit lines 255, 264 and 274 enter the chamber of the part throttle shift valve as indicated in FIG. 9.

Pitot amplifying valve

This valve, as shown in FIG. 10, has a movable member with a land 380 positioned in the chamber into which the pressure line 350 from the Pitot tube connects and it is spring pressed by a coil spring 381. This valve also has a land 383 and is arranged to bottom on a fixed portion of the valve body as at 386. Connecting into the valve is the line 303 which extends to and connects into the safety valve and cut-off valve. Also connecting into the valve is a pressure line 388 which connects into the rear pump line 160 of the rear pump 125 (FIG. 2). The Pitot amplifier valve has an exhaust 389. The line 303 actually extends through the Pitot amplifier valve as indicated at 390. The line 390 has a branch 392 which also connects into the Pitot amplifier valve and a branch 393 which connects into the governor valve 226 (FIG. 10).

The governor valve

The governor valve has a movable valve member with a land 400, and a land 402. The valve member is acted upon by a coil spring 405, which acts on the head 402 and reacts on a washer 407, slidably mounted on the valve member and held thereon by a head 408. At times the washer 407 seats on the shoulder 409.

Connecting into the governor valve is a line 412 (FIG. 10) which is actually a branch of the line 388 conveying oil under pressure from the rear pump 125. The governor valve has what might be termed a primary exhaust port 414 and the secondary exhaust port 415.

It will be understood, of course, that the various valves and many of the interconnecting conduit lines may be compactly formed in a general valve body. However, for purposes of clarity, many of the valves have been separated and individually shown in the drawings.

In considering the operation of the transmission and its control, the different conditions established by the selective positioning of the selector valve will be considered.

With the engine running, pressure from the front pump 25 passes into the main regulator valve through line 150 and 163, and the pressure may be regulated by shift of the valve member to a position as indicated in FIG. 5, with discharge through port 159. Main line pressure passes through the main regulator valve 152 into line 170.

*Park position*

In the park position the selector valve member is in the uppermost position, and line 170 communicates into line 231 (park-neutral-brake) in the area between carrier 104 and member 91. The thrust on the carried 104 is communicated therethrough to the sun gear 85 and insures release of the cone 89 from the brake member 90. The line 246–248 to the reverse brake is vented through the exhaust 249. The line 236 (town-country-low) and the line 233 (town-country) are both vented through the port 249. The line 242 (town-reverse-low) is exhausted through the line 243 out the end of the selector valve below the land 186.

As foresaid, the selector valve cannot be moved into the park position at vehicle speeds which provides a governor pressure in line 174 to hold the piston 195 in blocking position (FIG. 3). This governor pressure comes from the governor valve through line 303, into line 173, to the main regulator valve, thence into line 174 to the blocker cylinder 194. When the vehicle drops below a minimum speed, the governor pressure drops so that the blocker piston 195 is retracted by the spring 196 thus permitting the selector valve to be shifted to the park position. As foresaid, when parked, the park pawl 121 may be engaged with the teeth 120 of the member 97. The terminology applied to some lines, such as town, country, low, are abbreviated on the drawings where the first letters of these terms are indicated.

The venting of the lines 236, 233 and 242 exhausts the clutch and brake cylinders of the rear unit of the transmission so that no drive is transmitted. The park neutral brake line 231 and the front unit low line 371 when not supplied with fluid will exhaust sufficiently by leakage so that no brake or clutch is engaged. This is the condition which maintains when the engine is at rest and there is no pressure of the hydraulic medium. If the engine is running the fluid pressure in the system will be connected through the selector valve 181 to line 231 to engage the park-neutral-brake and through front shift valve 222 to line 371 to engage low in the front unit.

*Neutral position*

In the neutral position the selector valve member is moved to neutral position, the main line pressure remains connected through line 170 to the line 231 (park-neutral-brake) and lines 233, 236 and 243 remain exhausted. Thus the transmission remains conditioned with no oil under pressure transmitted to the clutch and brake operating cylinders of the rear unit. When the engine is started or the vehicle is coasting the pumps 25 and 125 will provide fluid under pressure to line 170 to the front shift valve 224 to engage the front low ratio and to line 231 to engage the park-neutral-brake.

*High-range or country position*

When the selector valve is in this position it is as shown in FIG. 3. Main line pressure from line 170 is admitted into lines 233 (town-country) and lines 236 (town-country-low). Line 231 (park-neutral-brake) and the line 246–248 (reverse) are exhausted through port 249. Also the line 242–243 (town-reverse-low) is exhausted through the lower end of the selector valve.

*Low range or town position*

In this position, the main line pressure is cut off from line 233 (town-country) but is opened to line 236 (town-country-low) and main line pressure is also admitted from line 170 to line 242 (town-reverse-low). The line 243 which serves to exhaust line 242 is closed.

Considering now the forward operation of the transmission both in low range (town) and in high range (country). Line pressure extends through the main regulator valve, line 170, to the front shift valve 224. This pressure is admitted through the front shift valve 224 (FIG. 9) to line 371 and into the cylinder 66 (FIG. 1) to engage the low speed brake of the front unit 62–63. Main line pressure in line 170 is admitted into line 236 (town-country-low) through the selector valve and line 236 connects into the rear shift valve 216 and admits oil into line 345 which conducts oil into the cylinder 92. This engages the low ratio brake 89–90 of the rear planetary unit. Therefore, the front planetary unit transmits torque at its reduced ratio and the rear planetary unit transmits torque at its reduced ratio, and the transmission is conditioned for its lowest ratio, for example, about 2.10:1. The first upshift is in front planetary unit. As the speed of the car increases, the main regulator valve shifts, as shown in FIG. 5, so that oil from the front pump is exhausted through port 159 and oil from the rear pump enters the line 170. Pressure from the rear pump passes to the governor valve through line 388 to line 303 thence through the safety valve 206 into line 301, which enters the front shift valve above the head 364. Thus the front shift valve is subjected to pressure which varies with the speed of the vehicle. Also, the front shift valve is under the influence of pressures in lines 255, 264 and 270 which connect into the throttle regulator valve 201 and throttle valve 203. Pressure in line 270 is admitted under the head 375 of the front shift valve. Pressure is also admitted under the head 364 from line 255 which is supplied by the throttle regulator valve 201. With the front shift valve down shifted, line 255 is connected via line 264, check valve 272 and 274 to the space below head 375. Line 264 is connected through check valve 267 to the space below head 364. Thus the front shift valve is under the influence of pressure incident to speed, and pressure incident to position of the throttle which can be translated into terms of torque, and when speed and torque conditions dictate, the front shift valve member is shifted downwardly to position the head 361 so as to shut off the pressure line 170 from the line 371 and to open the line 170 to line 370 and thus the low ratio cone brake 62–63 is released and the direct drive clutch 70 engaged.

When conditions dictate, as by lowering of the speed, the front shift valve may shift back to the position shown in FIG. 9, for low ratio drive in the front unit. It is at this time that the self-energizing feature of the cone brake becomes effective. The torque felt on the gearing, as aforesaid, urges the cone 62 towards engagement and it engages under this load as the clutch 70 disengages. This engagement may actually occur at times before pressure is transmitted into the cylinder 66. Thus, there is a smooth and self-timing interrelation between the clutch 70 and the cone brake 62–63. As the clutch 70 is disengaging and therefore lessening the load on the cone member 62 the thrust incident to torque is engaging the brake so that there is no lag or break or time period between the disengagement of the disc clutch and the engagement of the cone brake.

The self-timing interrelationship of the cone brake 62–63 and the clutch 70 is also effective during the engagement of the clutch and the release of the brake. As the piston 73 applies packing pressure to the clutch, reaction is taken by the brake member 62 inasmuch as the torque load on the helical teeth loads the brake member to the right, as FIG. 1 is viewed, even when the cylinder 66 is exhausted of oil. As the clutch gradually engages, the engaging load on the cone member 62 gradually lessens, and finally as the clutch 70 nears full engagement the brake member 62 is urged to the left and the brake member disengaged. So in this function, there is a self-timing operation with no time period involved when both the clutch and the brake are disengaged. The brake and clutch arrangement involving the brake 89–90 and the clutch 95 for the rear unit operates in substantially the same manner, with the self-timing function occurring as the clutch 95 is being engaged and the brake disengaged, and when the brake is engaging and the clutch disengaging. The rear unit cone is not fully self-engerizing from the sun gear helix.

Thus, when the operator places the selector valve in low range or "town" position the transmission normally functions with the rear planetary set operating in reduction and two speed ratios available in the front planetary unit.

In the high range or country position, which is the position of the selector valve shown in FIG. 3, main line pressure from line 170 is admitted into lines 233 and 236. Line 236 extends to the rear shift valve. Line 242 through line 243 is vented. Since this line connects into line 244 there is no pressure on the top of the head 330. The rear shift valve moves upwardly thus connecting line 236 to line 326, thus engaging the disc clutch 95 and conditioning the rear unit in 1:1 ratio. At the same time line 345 is exhausted at the rear shift valve. Pressure from line 170 passes through the front shift valve 224 into line 371, and thence into the cylinder 66 to engage the cone brake of the front unit and condition it for transmission of torque at reduced ratio. At this time line 370 leading to the cylinder for the disc clutch 70 is exhausted through port 368. Under proper conditions of speed and torque the front shift valve member raises, as FIG. 9 is viewed, thus connecting line 170 with the line 370, thus introducing oil into the cylinder for engaging the clutch 70 thus conditioning the front unit for 1:1 drive. The normal operation in country range is therefore with shift of the front unit from low ratio to direct with the rear planetary unit in 1:1 ratio.

Down shift in country range

This shift involves releasing the front unit clutch 70 and engaging the cone brake 62–63. It may occur at vehicle speeds in a range of 55 m.p.h. or lower. An operator may effect this shift in order to reduce the ratio for acceleration of the vehicle as, for example, for the passing of another vehicle.

The operator depresses the accelerator. When this is done the head 285 enters the recess 283 and it meets resistance due to the oil escaping through the recess 281. This serves as a detent action to impart intelligence to the operator. When this is done the TV pressure in line 255 connects through line 261 and into the T pressure line 264. This line (FIG. 1) passes through the check valve 267 into the front shift valve under the head 364 and elevates it. The land 361 moves upwardly connecting pressure line 170 to line 371 (this being the position shown in FIG. 9) and vents line 370 through exhaust 368. Thus oil is conducted through line 371 to the cylinder 66 and the pressure line to the cylinder 74 is exhausted. Since torque is being transmitted, the thrust incident thereto urges the cone 62 into engagement with the brake member 63 as the clutch 70 is disengaging. Thus, the brake wil engage even before actuation of the piston 65 so that there is no time lag, as aforesaid, between the disengagement of the clutch 70 and the engagement of the brake 62–63. Accordingly, the engine cannot accelerate and "run away," so to speak. Pressure in the line 264 is necessary to do this because the governor pressure at this time is high. The high governor pressure in line 303 at this time shifts the cut-off valve 220 downwardly and thus the T pressure in lines 264 and 265 is cut off by the cut-off valve.

Part throttle downshift

The same downshift may be made at relatively lower speeds of the vehicle say, for example, under 35 miles per hour by shift of the throttle short of the detent action. This movement of the throttle valve connects TV pressure in line 255 via line 261 to provide T' pressure in line 270. This pressure passes through line 274 into the part throttle shift valve 225 so that it acts under the plug 375. This results in a similar shift of the front shift valve moving it upwardly, connecting the pressure line 371 to the brake 62–63 cutting off pressure line 370 to the disc clutch 70. At this time the throttle valve does not connect TV pressure in line 255 to the T pressure line 264. The governor pressure is lower at this time due to the lower vehicle speed.

Double downshift

At relatively lower vehicle speeds say, for example, up to 35 miles per hour, when operating in the high range at 1:1 ratio, a downshift may be made in both front and rear planetary units. To do this the throttle is depressed beyond the detent; the head 285 is urged into the recess 281. This, in the manner explained above, connects TV pressure in line 255 to T pressure in line 264, and effects a shift by connecting pressure line 170 into the pressure line 371 for the front unit brake and exhausts pressure line 370 for the front unit clutch. Pressure is also admitted into the line 264 which passes through the cut-off valve through line 265 thence through check valve 333 and line 332 into the rear shift valve. The rear shift valve member which is positioned upwardly at this moment is shifted down to the position shown in FIG. 7, and pressure in line 236 passes into line 345 to engage the cone brake of the rear planetary unit. At the same time, line 326 leading to the rear unit friction clutch is exhausted through line 325 and between ports 315 and 316 of the dump control valve 212, the exhaust being at 323. The shift in the two units occur substantially simultaneously.

The dump control plug 212 controls the exhaust from the rear unit high clutch cylinder 97. It is under the control of pressure entering through line 326 acting upon head 315 and pressure from line 312 passing through line 322 to the underside of the piston 320. This pressure in line 322 is open only at low speeds due to the function of the timing valve.

If full throttle is maintained, the front planetary unit will upshift first to direct drive followed by an upshift of the rear planetary unit to direct drive. However, if the throttle is relieved at a fairly low speed, the rear planetary unit will upshift first.

Timing valve

Governor pressure entering the timing valve 208 through line 173 at speeds above about ten miles per hour is sufficient to hold the timing valve member 305 down. This cuts off the pressure in line 312 from the underside of the dump control piston 320. It also cuts off the constant pressure line 312 which enters the cylinder portion 92a (FIG. 1). When the timing valve is upwardly positioned by reason of speeds under about ten miles per hour, or during an idling condition while the selector valve is in country, town or low position, there is a constant pressure introduced through line 237 into line 312 to act on the cone 89. The reason for this is that if an operator quickly depresses the throttle, the rear planetary unit is conditioned to transmit torque at its reduced ratio. The relief of pressure under the piston 320 permits a high rate of exhaust of the rear clutch cylinder 97.

Cut-off valve

The cut-off valve function has been heretofore considered in connection with the description in conjunction with some of the ratio shifts. Above about 35 miles per hour, the governor pressure entering line 303 is high enough to shift the valve downwardly and close off the connection between lines 265 and 332. This cuts off T pressure from passing to the rear shift valve.

Low range

When the selector valve is shifted to the low position the transmission is conditioned to transmit torque through both the front and rear planetary units at low ratio. However, there is a function of the safety valve which permits of an upshift in case of excessive engine speeds.

When in the low position, main line pressure is opened to line 242 (T–R–Lo), and to line 236 (T–C–Lo). Pressure in line 233 (T–C) is cut off from the safety valve. The safety valve 206 (FIG. 6) shifts downwardly and cuts off governor pressure line 303 from line 301 leading to the front shift valve 224. Line 236 (T–C–Lo) is cut off by the regulator knock down valve 205 from the main regulator valve 152 because the safety valve no longer holds the regulator knock down valve in upward position (FIG. 6). This results in higher line pressure. The pressure in line 242 (T–R–Lo) is transmitted to line 244 into the rear unit blocker plug 214 thus holding the rear shift valve in its low position. The transmission is thus locked, so to speak, in its lowest range. However, if under these conditions, there is an excessive engine speed, resulting in excessive high pressure in the governor line 303, the governor pressure entering the safety valve and functioning on the differentially sized heads 295 and 296 will shift the safety valve upwardly and open the line 301 to line 303 thus transmitting pressure to the cylinder 366 at the upper end of the front shift valve 224 which will cause the valve to function and shift the front unit from its low ratio to its high ratio.

Reverse

When the selector valve is in reverse position, main line pressure from line 170 is admitted into line 247 (T–R–Lo) which communuicates into line 246 which in turn leads to the cylinder 110 which functions to engage the brake 106–107. Also the line 242 (T–R–Lo) is open to main line pressure. Since the vehicle will be going backwards, there is no rear pump pressure. The only source of pressure is the front pump. Pressure in the main line 170 passes through the front shift valve 224 and into line 371 and into cylinder 66 to engage the cone brake of the front planetary unit. Thus, the front planetary unit is in reduction as it transmits torque to the second planetary unit which is conditioned for reverse.

At this point it seems fitting to again point out that when the selector valve is in town, or low position, the hydraulic medium is conducted into the governor valve through line 242 thus raising it to close off the lower exhaust port 415. This causes an increase in governor pressure in town, and low range. Since shift is desired in the town range at lower vehicle speeds, the increase in the governor pressure incident to the closing off of one exhaust port, results in sufficient pressure for effecting such shifts.

Operation in reverse

Attention is directed to the conduit lines leading to the cylinder 110–110a, the piston in which functions to engage the reverse brake 106–107. For effecting a gradual engagement oil under pressure is delivered rapidly through line 246 into the small diameter portion of the cylinder 110a for a fast initial engagement. Oil under pressure bleeds more slowly into cylinder 110 to insure a slow build up and positive engagement ultimately. Thus, in operating in reverse, the brake 106–107 is softly and gradually engaged to provide smooth operation. This is particularly desirable in view of the relatively high reduction in reverse. However, when the line is exhausted the cylinder 110 exhausts rapidly through the check valve 251 as does, of course, the cylinder 110a.

Governor valve

The pressure produced by the rear pump is proportional to vehicle speed as determined by the main regulator valve. The pressure from the rear pump passes to the Pitot amplifier valve through line 388 and to the governor valve through line 412 where it is exhausted through ports 414 and 415. The pressure from line 388 passes into the line 303. At low vehicle speeds, the pressure acting upon the underside of head 380 is not sufficiently high to elevate this head against the action of the spring 381 plus the pressure from the Pitot tube entering through line 350. The governor pressure passing through line 393 acts on the land 400 but at low speeds is insufficient to depress the governor valve. The normal forward limit of the governor valve member is determined by the spring pressed washer 407. As vehicle speed increases, rear pump pressure increases, the governor valve is depressed and the head 400 cuts off pressure line 412 from the exhaust ports. At the same time Pitot pressure has been increasing thus increasing the load on the top of the head 380. Increase of speed results in increase of Pitot pressure shifting the amplifier valve member downwardly thus connecting the rear pump pressure line 388 into the governor line 303; governor pressure is then effective on the underside of head 380 tending to shift the amplifier valve upwardly and tending to close the connection between the rear pump pressure line 388 and the governor line 303. Thus it will be seen that the Pitot pressure causes the Pitot amplifier valve to regulate the governor pressure in line 303. Moreover, when the selector valve is in town and low positions, pressure is introduced into the governor valve through line 242 which acts on the underside of the valve member and elevates it to close exhaust port 415 by the head 402. This functions to increase the governor pressure in town and low range below the point where Pitot takes over.

I claim:

1. In a mechanism for the transmission of torque from an engine having a throttle, the combination of a driving member, a driven member, a front planetary gear set connected to the driving member, a rear planetary gear set connected with the driven member, the output member of the front set being the input member of the rear set, two friction engaging devices interrelated with the front gear set and selectively engageable to condition the front set to transmit torque at relatively high and relatively low ratios and to cause a shift in said condition, two friction engaging devices interrelated with the rear gear set and selectively engageable to condition the rear set to transmit torque at relatively high and relatively low ratios and to cause a shift in said condition, hydraulic motors operable to cause engagement and disengagement of the friction devices, a hydraulic system including pressure lines leading to the motors, an engine throttle controlled member, controlling valves in the system including a shift valve for the front gear set, a shift valve for the rear gear set, a valve operable by the throttle controlled member, means including a port in the throttle operated valve connected by a conduit line into the shift valve for the front gear set, means including a port in the throttle operated valve connected by a conduit line to a shift valve for the rear gear set, a cut-off valve in the last mentioned conduit, means supplying governed hydraulic medium under pressure proportional to the speed of the vehicle acting upon the cut-off valve so that it is open at relatively low vehicle speeds, said ports and conduit lines being opened to hydraulic pressure substantially upon full depression of the engine throttle member, whereby at relatively low vehicle speeds hydraulic pressure is conveyed to both shift valves for the front and rear gear sets to cause both sets in shift to a lower range, the governed pressure to the cut-off valve increasing at higher vehicle speeds to close off the line to the shift valve for the rear gear set, whereby on substantially full depression of the throttle member at relatively higher vehicle speeds the front gear set only shifts to a lower ratio.

2. In a mechanism for the transmission of torque from an engine having a throttle, the combination of a driving member, a driven member, a front planetary gear set connected to the driving member, a rear planetary gear set connected with the driven member, the output member of the front set being the input member of the rear set, two friction engaging devices interrelated with the first gear set and selectively engageable to condition the front set to transmit torque at relatively high and relatively low ratios and to cause a shift in said condition, two friction engaging devices interrelated with the rear gear set and selectively engageable to condition the rear set to transmit torque at relatively high and relatively low ratios and to cause a shift in said condition, hydraulic motors operable to cause engagement and disengagement of the friction devices, a hydraulic system including pressure lines leading to the motors, an engine throttle member, controlling valves in the system including a shift valve for the front gear set, a shift valve for the rear gear set, a valve operable by the throttle member, means including ports in the throttle operated valve and conduits connecting said ports to the shift valves for the front and rear gear sets, a cut-off valve in the line leading to the shift valve for a gear set, means providing governed hydraulic medium under pressure to the cut-off valve which is relatively low at low vehicle speeds and relatively high at higher vehicle speeds so that the cut-off valve is respectively in opened and in closed positions, said conduit lines being open to hydraulic pressure at the throttle operated valves substantially on complete depression of the engine throttle member, whereby at relatively low vehicle speeds both front and rear gear units shift to a lower ratio and at relatively high vehicle speeds with the cut-off valve closed the front gear set only shifts to a lower ratio.

3. In a mechanism for the transmission of torque from the engine of an automotive vehicle, the combination of a driving member, a driven member, a front planetary gear set connected to the driving member, a rear planetary gear set connected with the driven member, the output member of the front set being the input member of the rear set, two friction engaging devices interrelated with the front gear set and selectively engageable to condition the front set to transmit torque at relatively high and relatively low ratios and to cause a shift in said condition, two friction engaging devices interrelated with the rear gear set and selectively engageable to condition the rear set to transmit torque at relatively high and relatively low ratios and to cause a shift in said condition, hydraulic motors operable to cause engagement and disengagement of the friction devices, a hydraulic system including pressure lines leading to the motors, an engine throttle member, controlling valves in the system including a shift valve for the front gear set, a shift valve for the rear gear set, means selectively operable to introduce hydraulic medium into hydraulic motors for conditioning both front and rear planetary sets for the transmission of torque in low ratio, a safety valve in the system, means for supplying to the safety valve hydraulic medium under pressure which varies with the speed of the engine, said pressure increasing with an increase of engine speed to actuate the safety valve, and conduit means opened by actuation of the safety valve to convey hydraulic medium effective upon the shift valve for the front gear set to shift it into a higher radio whereby to prevent excessive engine speeds.

4. In a mechanism for the transmission of torque from the engine of an automotive vehicle, the combination of a driving member, a driven member, a front planetary gear set connected to the driving member, a rear planetary gear set connected with the driven member, the output member of the front set being the input member of the rear set, two friction engaging devices interrelated with the front gear set and selectively engageable to condition the front set to transmit torque at relatively high and relatively low ratios and to cause a shift in said condition, two friction engaging devices interrelated with the rear gear set and selectively engageable to condition the rear set to transmit torque at relatively high and relatively low ratios and to cause a shift in said condition, hydraulic motors operable to cause engagement and disengagement of the friction devices, a hydraulic system including pressure lines leading to the motors, an engine throttle member, controlling valves in the system including a shift valve for the front gear set, a shift valve for the rear gear set, means selectively operable to introduce hydraulic medium into hydraulic motors for conditioning both front and rear planetary sets for the transmission of torque in low ratio, a safety valve in the system, means for supplying to the safety valve hydraulic medium under pressure which varies with the speed of the engine, said pressure increasing with an increase of engine speed to actuate the safety valve, and conduit means opened by actuation of the safety valve to convey hydraulic medium effective upon the shift valve for one gear set to shift it into a higher ratio whereby to prevent excessive engine speeds.

5. In a mechanism for the transmission of torque from the engine having a throttle, the combination of a hydraulic torque converter having an output member, transmission gearing of the planetary type, the output member of the torque converter being the input member of the gearing, the gearing having an output member drivingly connected to traction wheels of the vehicle, friction devices engageable and disengageable for conditioning the gearing for the transmission of torque at different speed ratios, hydraulic motors for operating the friction devices, a hydraulic system for conveying hydraulic medium to the motors, means driven by the engine for providing hydraulic medium under pressure, a valve in the system positioned in a conduit line which extends to a hydraulic motor of a friction device for conditioning the gearing for the transmission of torque at a relatively high ratio, other conduit means for conducting hydraulic medium under pressure to said valve, the hydraulic torque converter and the gearing having the characteristic of delivering light torque to the traction wheels when the vehicle is at rest and the engine idling with substantially closed throttle, a throttle valve controlled by the throttle, said other conduit means being opened by the throttle valve when in substantially closed position for conveying hydraulic medium to the said valve to actuate it for the admission of hydraulic medium to a hydraulic motor for conditioning the gearing for the transmission of torque at a relatively higher ratio, to thereby substantially prevent creep of the vehicle.

6. In a transmission, planetary gearing having a torque input member and a torque output member, a friction engaging device interrelated with the planetary gearing and engageable to condition it for the transmission of torque, a hydraulic motor for actuating the friction engaging device, including a cylinder having two cylinder portions, a stepped piston fitting therein and thereby forming two cylinder areas, a conduit for hydraulic medium, shift control means for introducing hydraulic medium under pressure into the conduit and for exhausting the conduit, said conduit having a branch in free communication with one cylinder area, a relatively small port in restricted communication with the other cylinder area, a branch leading to said other cylinder area, a check valve in the last named branch, whereby hydraulic medium is freely introduced into one area for fast low force engagement and is bled into the other area for gradual high force engagement with the friction device, said check valve providing for rapid exhaust of said other cylinder area when the hydraulic line is opened to exhaust.

7. A mechanism as recited in claim 6 characterized in that the cylinder is of annular form and the piston is of annular form, and further characterized in that the first cylinder area is disposed on the shorter radius and the second cylinder area is disposed on the larger radius.

8. In a transmission for transmitting torque from an engine to the traction wheels of a vehicle, gearing of the planetary type, a first ratio device interrelated with the gearing to establish a first ratio, a second ratio device interrelated with the gearing to establish a second ratio, hydraulic motors for operating said ratio devices to selectively condition the gearing for the transmission or torque at different ratios, a pump operated by the engine for providing hydraulic medium under pressure, conduit lines for hydraulic medium extending to hydraulic motors, means selectively operable to introduce hydraulic medium to the motors and to control the pressure of the hydraulic medium at a relatively low value when the engine is idling and a relatively high value when the engine is running, a secondary hydraulic motor acting upon said first ratio drive, a conduit line leading thereto, means providing a governor medium at low vehicle speeds and a valve actuated by the pressure of the governor medium for opening the conduit line to the secondary motor at the low pressure incident to engine idling speeds and low vehicle speeds, whereby the first ratio device is held engaged with the vehicle at rest and the engine idling, the hydraulic medium to the secondary motor being cut off therefrom by operation of the valve upon increase of pressure incident to acceleration of the engine and vehicle.

9. In a transmission for transmitting torque from an engine to the traction wheels of a vehicle, gearing of the planetary type providing two forward ratios, a first friction engaging device interrelated with the gearing to establish a low ratio, a second friction engaging device interrelated with the gearing to establish a high ratio, hydraulic motors for operating the friction device to selectively condition the gearing for the transmission of torque at different ratios, a pump operated by the engine for providing hydraulic medium under pressure, conduit lines for hydraulic medium extending to the hydraulic motors, means selectively operable to intoduce hydraulic medium to the motors, the pressure of the hydraulic medium, when the engine is idling and the vehicle is at rest, being relatively low, a secondary hydraulic motor acting upon said first friction engaging device, a conduit line leading thereto, and a valve actuated by the pressure of the hydraulic medium for opening the conduit line to the secondary motor at the low pressure incident to engine idling speeds, whereby the said one friction engaging device is held engaged with the vehicle at rest and the engine idling, the hydraulic medium to the secondary motor being cut off therefrom by operation of the valve upon increase of pressure incident to acceleration of the engine.

10. In a hydraulic control for a transmission for delivering torque from an engine to the traction wheels of an automotive vehicle, a pump for hydraulic medium driven by an output member of the transmission, whereby the pump speed and pressure of the pumped medium varies with vehicle speed, a shell in and driven by the transmission for retaining a ring of hydraulic medium as it rotates, a Pitot tube in the shell, hydraulic motors operable on the transmission to change the speed ratios thereof, a hydraulic system including control means and conduits extending to the motors for controlling the operation thereof, a governor valve, a pressure line extending from the pump to the governor valve with the pressure thereof effective on the governor valve, a pressure line extending from the Pitot tube to the governor valve with the pressure thereof effective thereon, a conduit line extending from the governor valve and connected to said hydraulic system including said control means conducting hydraulic medium under governor pressure to the hydraulic system to control said control means.

11. The hydraulic control as recited in claim 10, characterized in that there is a valve in the system shiftable for controlling the actuation of one of the hydraulic motors, and a pressure line extending from the Pitot tube directly to said valve with the pressure thereof effective on the shift valve to control its movements.

12. In a transmission, gearing providing a low and a high ratio, a low ratio device interrelated with said gearing to establish said low ratio, a high ratio device interrelated with said gearing to establish said high ratio, a main hydraulic motor for operating each ratio device to selectively condition said gearing for the transmission of torque at said low and high ratios, a secondary hydraulic motor having a smaller engaging force for operating said low ratio device, a source of fluid under pressure, control means having a first position connecting said source to said main motor for said low ratio device and to said secondary motor to provide a combined higher engaging force for said low ratio device and a second position to connect said source to said main motor for said high ratio device and to said secondary motor for said low ration device to frictionally lock the transmission, means to provide a governor pressure proportional to the speed of said gearing, and means responsive to said governor pressure to disengage said secondary hydraulic motor when the speed of said gearing exceeds a predetermined low forward speed value.

13. In a variable speed power transmission mechanism for an engine having a power demand signal device, a drive unit providing a drive between an input and an output member and having fluid pressure actuated motor means operative to establish said drive ratios, a source of fluid under pressure, first control valve means connected to said source and operative in accordance with the operation of the engine signal device to supply a first signal pressure proportional to the operation of the engine signal device, governor means connected to said source and operative in accordance with the speed of operation of said unit to supply a second signal pressure proportional to a speed of operation of said unit, shift valve means subject to the conjoint action of the signal pressures from said first control valve means and said governor means to control the supply of fluid from said source to said fluid pressure actuated motor means for movement from a first position to a second position establishing said drive and second control valve means movable from one position to another position to control the flow of one of said signal pressures to said shift valve means independent of the position of said shift valve means at a predetermined pressure value of said second signal pressure.

14. The invention defined in claim 13 and said one of said signal pressures being said first signal pressure.

15. The invention defined in claim 13 and said one of said signal pressures being said second signal pressure.

16. In a variable speed power transmission mechanism for an engine having a power demand signal device, a gear unit providing a first and second speed ratio and including an input and an output member and having fluid pressure actuated motor means operative to establish said first and second ratios, a source of fluid under pressure, first control valve means connected to said source and operative in accordance with the operation of the engine signal device to supply a first signal pressure proportional to the operation of the engine signal device, governor means connected to said source and operative in accordance with the speed of operation of said gear unit to supply a second signal pressure proportional to the speed of operation of said gear unit, shift valve means subject to the conjoint action of the signal pressures from said first control valve means and said governor means to control the supply of fluid from said source to said fluid pressure actuated motor means for movement at predetermined pressures from one to another position to in a first position establish said first ratio and in a second position establish said second ratio and second control valve means independently connected to said second signal pressure for movement from one position to another position to control the flow of one of said signal pressures to said shift valve means independent of the position of said shift valve means at other predetermined pressure values of said second signal pressure.

17. In a variable speed power transmission mechanism for an engine having a power demand signal device responsive to torque demand on the engine, a gear unit providing a first and second speed ratio and including an input and an output member and having fluid pressure actuated motor means operative to establish said first and second ratios, a source of fluid under pressure, first control valve means connected to said source and operative in accordance with the operation of the engine signal device to supply a first signal pressure proportional to the operation of the engine signal device, governor means connected to said source and operative in accordance with the speed of operation of said gear unit to supply a second signal pressure proportional to the speed of operation of said gear unit, shift valve means subject to the conjoint action of the signal pressures from said first control valve means and said governor means for movement between first and second positions at certain predetermined pressures to control the supply of fluid from said source to said fluid pressure actuated motor means to in a first position established said first ratio and in a second position establish said second ratio, and second control valve means independently connected to one of said signal pressures for movement from one position to another position to control the flow of the other of said signal pressures to said shift valve means independent of the position of said shift valve means at other predetermined pressure values of said one of said signal pressures.

18. In a variable speed power transmission mechanism for an engine having a power demand signal device responsive to torque demand on the engine, a gear unit providing a first and second speed ratio and including an input and an output member and having fluid pressure actuated motor means operative to establish said first and second ratios, a source of fluid under pressure, first control valve means connected to said source and operative in accordance with the operation of the engine signal device to supply a first signal pressure proportional to the operation of the engine signal device, governor means connected to said source and operative in accordance with the speed of operation of said gear unit to supply a second signal pressure proportional to the speed of operation of said gear unit, shift valve means subject to the conjoint action of the signal pressures from said first control valve means and said governor means for movement between first and second positions at certain predetermined pressures to control the supply of fluid from said source to said fluid pressure actuated motor means to in a first position establish said first ratio and in a second position establish said second ratio, and second control valve means independently connected to said second signal pressure for movement between one position disconnecting said second signal pressure from said shift valve means to another position to connect said second signal pressure to said shift valve means independent of the position of said shift valve means at other predetermined pressure values of said second signal pressure.

19. In a variable speed power transmission mechanism for an engine having a power demand signal device responsive to torque demand on the engine, a gear unit including an input and an output member and having a fluid pressure motor actuated ratio engaging device operable to effect a change in drive ratio, a source of fluid under pressure, first control valve means movable in accordance with the operation of the engine signal device and being operative to provide a control pressure proportional to the power demand on the engine, governor means responsive to the speed of operation of the transmission to provide a governor pressure proportional to the speed of operation of the transmission, ratio control means including a shift valve movable in accordance with said governor pressure and said control pressure at certain predetermined pressures between a first and a second position to connect said source to said ratio engaging device to provide a first and a second ratio, and a second control valve means independently connected to said governor means and movable by the governor pressure from said governor means independent of the position of said shift valve at other predetermined speeds operative to cut off the flow of control pressure from said first control valve means to said shift valve.

20. A transmission mechanism according to claim 19 and means responsive to a predetermined high torque demand to actuate said shift valve to downshift said gear unit from a high to a low ratio, and said second control valve disabling said last-named means above a predetermined speed to prevent a downshift.

21. In a variable speed power transmission mechanism for an engine having a fuel feed control device, a planetary gear unit providing a low and a high speed ratio including an input and an output member and having a fluid pressure motor actuated ratio engaging device operable to effect a change in drive ratio between said low and high ratio, a source of fluid under pressure, first control valve means movable in accordance with the operation of the engine control device and being operative to provide a control pressure at a predetermined high fuel feed position of the control device, governor means responsive to the speed of operation of the transmission to provide a governor pressure proportional to the speed of operation of the transmission, control means including a shift valve movable between a low and a high position to connect said source to said ratio engaging device to provide said low and said high ratio, means connecting said first control valve means to said shift valve to apply the control to said shift valve to downshift said shift valve from said high to said low ratio, and second control valve means movable by the governor pressure from said governor means at a predetermined speed operative to cut off the flow of control pressure fluid from said first control valve means to said shift valve.

22. In a control system for a mechanism a source of fluid under pressure, governor means connected to said source and operative in accordance with the speed of operation of said mechanism to provide a governor pressure in a governor line proportional to a speed of operation of said mechanism, including a speed responsive device connected to said mechanism and supplying a first control pressure increasing at a relatively low rate proportional to a speed of operation of said mechanism, a second speed responsive device operatively connected to said mechanism and supplying a second control pressure increasing at a relatively high rate proportional to the speed of operation of said mechanism and a governor control valve directly connecting said second control pressure from said second speed responsive device to said governor line to supply said governor pressure to said shift valve in a low range of speed of operation of said unit and to supply a pressure proportional to said first control pressure to said governor line to supply a governor pressure to said shift valve in a higher range of speed of operation of said unit.

23. In a transmission mechanism, a drive unit for establishing a drive between an input and an output member and having fluid pressure actuated control means operative to establish said drive, a source of fluid under pressure, governor means connected to said source and operative in accordance with the speed of operation of said unit to provide a governor pressure in a governor line proportional to a speed of operation of said unit, a shift valve subject to the action of said governor pressure to control the connection of said source to said fluid pressure actuated control means to establish said drive, said governor means including a first speed responsive device operatively connected to said unit and supplying a first control pressure increasing at a relatively low rate proportional to a speed of operation of said unit, a second speed responsive device operatively connected to said unit and supplying a second control pressure increasing at a relatively high rate proportional to the speed of operation of said unit and a governor control valve directly connecting said second control pressure from said second speed responsive device to said governor line to supply said governor pressure to said shift valve in a low range of speed of operation of said unit and controlling said second control pressure in accordance with said first control pressure to supply said controlled second control pressure to said governor line to supply a governor pressure to said shift valve in a higher range of speed of operation of said unit.

24. In a variable speed power transmission mechanism, a drive unit for establishing a drive between an input and an output member and having fluid pressure actuated motor means operative to establish said drive, a source of fluid under pressure, governor means connected to said source ond operative in accordance with a speed of operation of said unit to provide a governor pressure in a governor line proportional to the speed of operation of said unit, a shift valve subject to the action of said governor pressure to control the connection of said source to said fluid pressure actuated motor means to establish said drive, said governor means including a speed responsive device operatively connected to said unit supplying a control pressure proportional to a speed of operation of said unit, a pump driven by a transmission member and having means to supply a pump pressure proportional to a speed of said unit, and a governor control valve directly connecting one of said pump or control pressures to said governor line to supply said governor pressure to said shift valve in one range of values of said control pressure and controlling said pump pressure to provide a controlled pump pressure proportional to said control pressure and connecting said controlled pump pressure to said governor line to supply governor pressure to said shift valve in another range of values of said control pressure.

25. In a variable speed power transmission mechanism, a drive unit for establishing a drive between an input and an output member and having fluid pressure actuated motor means operative to establish said drive, a source of fluid under pressure, governor means connected to said source and operative in accordance with the speed of operation of said unit to provide a governor pressure proportional to the speed of operation of said unit, shift valve means subject to the action of said governor pressure to control the connection of said source to said fluid pressure actuated motor means to establish said drive, said governor means including a speed responsive device operatively connected to said unit supplying a control pressure proportional to a speed of operation of said unit, a pump driven by a transmission member and having means to supply a pump pressure proportional to the speed of one of said transmission members, and a governor control valve directly connecting said pump pressure to supply said governor pressure to said shift valve means below a predetermined control pressure valve and controlling said pump pressure to provide a controlled pump pressure proportional to said control pressure to supply said governor pressure to said shift valve means above said preselected control pressure valve.

26. In a transmission according to claim 25, and said means to supply a pump pressure proportional to a speed of operation of said unit including a series of orifices successively opened by said governor pressure.

27. In a transmission according to claim 25 and said unit including a first and second gear set connected in series through an intermediate member, said fluid pressure actuated motor means including motor means operative on each gear set to change the gear set ratio to provide at least three ratios in said gear unit, said shift valve means including a first shift valve for said first gear set and a second shift valve for said second gear set, said governor being connected to said intermediate member, said pump being driven by said transmission output member, and said control pressure being connected to one shift valve and said governor pressure being connected to the other shift valve.

28. In a transmission mechanism, a drive unit providing a driving connection between an input and an output member and having fluid pressure actuated motor means operative on the supply of fluid under pressure to establish said drive, a source of fluid under pressure, governor means connected to said source and operative in accordance with the speed of operation of said drive unit to supply governor pressure in proportion to the speed of operation of said drive unit, shift valve means controlled by said governor pressure for movement between a first position connecting said source to said motor means to establish said drive and a second position exhausting said motor means to disestablish said drive, and an exhaust control valve connected to control the exhaust from said motor means during drive disengagement and connected to said motor means for actuation by the pressure in said motor means to provide a relatively free exhaust during high pressures in said motor means and a restricted exhaust during lower pressures in said motor means.

29. In a transmission mechanism, a drive unit providing a driving connection between an input and an output member and having fluid pressure actuated motor means operative to establish said drive, a source of fluid under pressure, governor means connected to said source and operative in accordance with the speed of operation of said drive unit to supply governor pressure in proportion to the speed of operation of said drive unit, shift valve means controlled by said governor pressure for movement between a first position connecting said source to said motor means to establish said drive and a second position exhausting said motor means, an exhaust control valve connected to control the exhaust from said motor means controlled by said governor pressure to provide a free exhaust above a predetermined high speed of said drive unit and a restricted exhaust below said predetermined speed of said drive unit.

30. In a variable speed power transmission mechanism for an engine having a control device movable in response to torque demand on the engine from a zero torque demand position through an intermediate torque demand position to a substantially full torque demand position, a drive providing a drive and having fluid pressure actuated motor means operative to establish said drive, a source of fluid under pressure, control valve means connected to said source and operative in accordance with the operation of the engine control device to supply a first signal pressure proportional to the operation of said engine control device and to supply a second signal pressure at said intermediate torque demand position and to supply a third signal pressure at said substantially full torque demand position, governor means connected to said source and operative in accordance with speed of operation of said unit to supply a governor pressure proportional to the speed of operation of said unit, shift valve means having a governor area subject to the action of said governor pressure to move said shift valve means in one direction and having a second area subject to the action of said first and third signal pressures to move said shift valve means in the opposite direction and having a third area subject to the action of said second signal pressure to move said shift valve means in the said opposite direction to control said shift valve means for movement from one position to a second position connecting said source to said motor means to establish said drive unit.

31. In a transmission according to claim 30 and one-way valve means to connect said second signal pressure to said second area.

32. In a transmission mechanism, a gear unit providing a first, second and third speed ratio and having fluid pressure actuating motor means operative to establish said first, second, and third ratios, a source of fluid under pressure, governor means connected to said source and operative in accordance with the speed of operation of said gear unit to provide a governor pressure proportional to the speed of operation of said gear unit, shift valve means including a first and a second shift valve each operative between a low position and a high position and operative jointly to connect said source to said motor means with both valves in said low position to provide said first ratio, with one valve in the high position and the other in the low position, to provide said second ratio, and with both valves in the high position to provide said third ratio, means biasing said shift valves to the low position, said governor means connected to said shift valves to move said shift valves to said high position, manual control means operable in one position to disconnect said governor pressure from said other of said shift valves to prevent a shift to high ratio and safety valve means operative in response to a predetermined high governor pressure to connect said governor pressure to said other of said shift valves to provide a safety shift to fourth speed ratio during high vehicle speeds.

33. In a transmission mechanism according to claim 32, a regulator valve connected to said source to regulate the pressure of said source, and means responsive to the operation of said safety valve connected to said regulator valve to reduce the regulated pressure of said source.

34. In a transmission mechanism, a gear unit providing a first, second, third and fourth speed ratio and having fluid pressure actuating motor means operative to establish said first, second, third and fourth ratios, a source of fluid under pressure, governor means connected to said source and operative in accordance with the speed of operation of said gear unit to provide a governor pressure proportional to the speed of operation of said gear unit, shift valve means including a first and a second shift valve each operative between a low position and a high position and operative jointly to connect said source to said motor means with both valves in said low position to provide said first ratio, with one valve in the high position and the other valve in the low position to provide said second ratio, and with said one valve in the low position and said other valve in the high position to provide third ratio and with both valves in the high position to provide said fourth ratio, means biasing said shift valves to the low position, said governor means connected to said shift valves to move said shift valves to said high position, manual control means operably connected to said shift valve means to permit establishment of said first and third ratios and in another position to permit establishment of said first, second and fourth ratios.

35. In a transmission mechanism for an engine having a fuel feed control device movable from a zero position through a plurality of fuel feeding positions, a drive unit for establishing a drive having motor means operative to establish said drive, a source of fluid under pressure, a regulator valve connected to said source to regulate the pressure of said source, means responsive to said fuel feed control device when substantially in said zero position to substantially reduce the regulated pressure of said source and being ineffective in other positions of said fuel feed device, and means connecting said source to said motor means to establish said drive.

36. In a transmission mechanism for an engine having a fuel feed control device movable from a zero position through a plurality of feeding positions, a drive unit for establishing a plurality of drive ratios having motor means operative to selectively establish said drive ratios, a source of fluid under pressure, a regulator valve connected to said source to regulate the pressure of said source, control means responsive to said fuel feed control device when substantially in said zero position to substantially reduce the regulated pressure of said source and being ineffective in other positions of said fuel feed device, shift means connecting said source to said motor means to selectively establish said drive ratios, and range control means to limit said shift means to the establishment of a low speed ratio and to disable said control means.

37. In a transmission mechanism, a gear unit providing a plurality of ratios connected between input and output members and having motor means operable to establish each of said plurality of ratios, a source of fluid under pressure, a regulator valve connected to said source to control the pressure of said source, shift valve means connecting said source to said motor means to selectively establish each of said ratios, a knock down valve having a closed position and an open position connecting said source to said regulator valve to reduce the pressure regulated by said regulator valve and manual control means having a high range position opening said knock down valve in a low range position closing said knock down valve.

38. In a transmission mechanism according to claim 37 and governor means responsive to a predetermined speed of operation of said gear unit connected to said knock down valve to open said knock down valve.

39. In a transmission mechanism, a gear unit providing a plurality of ratios connected between input and output members and having motor means operable to establish each of said plurality of ratios, a source of fluid under pressure, a regulator valve connected to said source to control the pressure of said source, shift valve means connecting said source to said motor means to selectively establish each of said ratios, a knock down valve having a closed position and an open position connecting said source to said regulator valve to reduce the pressure regulated by said regulator valve, manual control means having a high range position operatively connected to said shift valve means to establish a high ratio and opening said knock down valve and a low range position operatively connected to said shift valve means to establish a low ratio and closing said knock down valve, governor means responsive to a predetermined high speed of operation of said gear unit connected to said knock down valve to open said knock down valve and connected to said regulator valve to decrease the regulator pressure of said source in accordance with increasing speed of operation of said gear unit.

40. In a transmission mechanism, a multiratio gear unit providing a plurality of ratios and including motor means operable to selectively establish each of said ratios, a source of fluid under pressure, governor means connected to said source and operatively connected to said multiratio gear unit to provide a governor pressure proportional to a speed of operation of said gear unit, shift means controlled by said governor pressure to connect said source selectively to said motor means to provide each of said ratios, manual control means operative in one range to provide for the establishment by said shift means of one or more relatively high ratios and a second position providing for one or more relatively lower speed ratios, said control means being connected to said governor means in one of said positions to change said governor pressure proportional to said speed of operation of said gear unit.

41. In transmission mechanism, the combination of drive shaft, a driven shaft, means providing a low speed power train between said shafts, means providing a high speed power train between said shafts, a control element for controlling changes between said power trains and having a low speed drive position and a high speed drive position, a hydraulic governor driven by said driven shaft and providing a fluid pressure that increases with driven shaft speed and effective on said control element tending to hold it from movement from its high speed position to its low speed position, said control element having a relatively large land thereon and a small land thereon, a source of fluid pressure providing a predetermined operating pressure, and a valve for selectively applying the same pressure from said source to one or the other of said lands for applying either a relatively large or a relatively small force on said control element tending to move it from its high speed position to its low speed position against the action of said governor controlled fluid pressure depending on the land to which fluid pressure is applied.

42. In transmission mechanism, the combination of a drive shaft, a driven shaft, means providing a low speed power train between said shafts, means providing a high speed power train between said shafts, a control element for controlling changes in drive between said power trains and having a low speed drive position and a high speed drive position, a hydraulic governor driven by said driven shaft and providing a fluid governor pressure that increases with driven shaft speed and applied on said control element tending to hold the control element from movement from its high speed position to its low speed position, said control element having a large land and a small land thereon, a source of fluid pressure including a supply conduit for providing a predetermined operating pressure, and a selector valve for connecting said supply conduit to one or the other of said lands for thereby moving said control element from its high speed position to its low speed position against the action of said governor pressure at a higher driven shaft speed when the fluid pressure source is connected to said large land or at lower driven shaft speed when said pressure source is connected to said small sized land.

43. In a transmission mechanism, a drive unit providing a driving connection between an input and an output member and having fluid pressure actuated motor means operative to establish said drive, a source of fluid under pressure, governor means connected to said source and operative in accordance with the speed of operation of said drive unit to supply governor pressure in proportion to the speed of operation of said drive unit, shift valve means controlled by said governor pressure for movement between a first position connecting said source to said motor means to establish said drive and a second position exhausting said motor means, an exhaust control valve connected to control the exhaust from said motor means and connected to said motor means for actuation by the pressure in said motor means to provide a relatively free exhaust during high pressures in said motor means and a restricted exhaust during lower pressures in said motor means, and means connecting said governor pressure to said exhaust control valve to provide a relatively free exhaust at all times above a predetermined speed of operation of said drive unit.

44. In a transmission mechanism, a gear unit providing a first, second and third speed ratio and having fluid pressure actuating motor means operative to establish said first, second and third ratios, a source of fluid under pressure, governor means connected to said source and operative in accordance with the speed of operation of said gear unit to provide a governor pressure proportional to the speed of operation of said gear unit, shift valve means including a first and a second shift valve each operative between a low position and a high position and operative jointly to connect said source to said motor means with both valves in said low position to provide said first ratio, with one valve in the high position and the other in the low position to provide said second ratio, and with both valves in the high position to provide said third ratio, means biasing said shift valves to the low position, said governor means connected to said shift valves to move said shift valves to said high position, and manual control means operable in one position to disconnect said governor pressure from one of said shift valves to prevent a shift to high ratio and operable in another position to hold the other shift valve in said low position.

45. In a mechanism for the transmission of torque from an engine having a throttle, the combination of a driving member, a driven member, a front planetary gear set connected to the driving member, a rear planetary gear set connected with the driven member, the output member of the front set being the input member of the rear set, two friction engaging devices interrelated with the first gear set and selectively engageable to condition the front set to transmit torque at relatively high and relatively low ratios and to cause a shift in said condition, two friction engaging devices interrelated with the rear gear set and selectively engageable to condition the rear set to transmit torque at relatively high and relatively low ratios and to cause a shift in said condition, hydraulic motors operable to cause engagement and disengagement of the friction devices, a hydraulic system including pressure lines leading to the motors, an engine throttle controlled member, controlling valves in the system including a shift valve operatively connected to establish said high or low ratio in the front gear set, a shift valve operatively connected to establish said high or low ratio in the rear gear set, a valve operable by the throttle controlled member, means including a conduit line and a port in the throttle operated valve operable only by substantially complete depression of the throttle member to convey hydraulic medium to the shift valve for the front gear set and operable at relatively high vehicle speeds to cause a shift therein from high ratio to a lower ratio, and another conduit line connecting into front shift valve, the throttle actuated valve having port means for causing introduction of hydraulic medium into said other line only upon high partial depression of the throttle member to cause a shift in the front gear set at relatively lower vehicle speeds from relatively high to relatively low ratio.

46. In a transmission mechanism for use with an engine having a power demand control member movable from zero to full power demand positions and to a downshift position, the combination of drive means providing a plurality of stepped ratios, a governor providing a governor signal corresponding to the speed of said drive means, power demand signal means providing a first signal corresponding to the position of said power demand control member in said zero to full power demand positions and a second signal in said downshift position, shift means responsive to said governor signal and said first signal operative to control said drive means to provide increasing stepped ratios in accordance with increasing drive means speed requiring higher speed with increasing first signal, and manual control means connected to said shift means and said power demand signal means in a low position to provide at least one low ratio and ineffective on said power demand signal means and in a high position to provide at least two ratios at least one of which is higher than said low ratio and effective on said power demand signal means to resist movement of said power demand signal means from said full power demand position to said downshift position to provide operator feel.

47. In transmission mechanism, the combination of drive shaft, a driven shaft, means providing a low speed power train between said shafts, means providing a high speed power train between said shafts, a control valve for controlling changes between said power trains and having a low speed drive position and a high speed drive position, a hydraulic governor driven by said driven shaft and providing a fluid pressure that increases with driven shaft speed and effective on said control valve tending to hold it from movement from its high speed position to its low speed position, said control valve having a relatively large land thereon and a small land thereon, a source of fluid pressure providing a predetermined operating pressure, and a valve for selectively applying the same pressure from said source to one or the other of said lands for applying either a relatively large or a relatively small force on said control valve tending to move it from its high speed position to its low speed position against the action of said governor controlled fluid pressure depending on the land to which fluid pressure is applied.

48. In transmission mechanism for use with an engine having a power demand control member, the combination of drive shaft, a driven shaft, means providing a low speed power train between said shafts, means providing a high speed power train between said shafts, a control valve for controlling changes between said power trains and having a low speed drive position and a high speed drive position, a hydraulic governor driven by said driven shaft and providing a fluid pressure that increases with driven shaft speed and effective on said control valve tending to hold it from movement from its high speed position to its low speed position, said control valve having a relatively large land thereon and a small land thereon, a source of fluid pressure providing a predetermined operating pressure variable in accordance with said power demand control member position, and a valve for selectively applying the same pressure from said source to one or the other of said lands for applying either a relatively large or a relatively small force on said control valve tending to move it from its high speed position to its low speed position against the action of said governor controlled fluid pressure depending on the land to which fluid pressure is applied.

49. In transmission mechanism, the combination of drive shaft, a driven shaft, means providing a low speed power train between said shafts, means providing a high speed power train between said shafts, control valve means for controlling changes between said power trains and having a low speed drive position and a high speed drive position, a hydraulic governor driven by said driven shaft and providing a fluid pressure that increases with driven shaft speed and effective on said control valve means tending to hold it from movement from its high speed position to its low speed position, said control valve means having a relatively large land thereon and a small land thereon, a source of fluid pressure providing a predetermined operating pressure, and a valve for selectively applying the same pressure from said source to one or the other of said lands for applying either a relatively large or a relatively small force on said control valve means tending to move it from its high speed position to its low speed position against the action of said governor controlled fluid pressure depending on the land to which fluid pressure is applied.

50. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said first gearing between various drive ratios thereof, said last-named means including a governor driven by said driven shaft and providing an output pressure that varies with changes in driven shaft speed, and means operably connected with said second gearing for providing a governor pressure effective on said drive changing means for one of the drive ratios in said second gearing which is different from said governor pressure which is effective for another drive ratio in said second gearing.

51. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said first gearing between various drive ratios thereof, said last-named means including a governor driven by said driven shaft and providing an output pressure that varies with changes in driven shaft speed, means operably connected with said second gearing for applying said output governor pressure on said drive changing means when said second gearing is driving in one of its drive ratios, and means for providing a pressure that varies with and is increased with respect to said first-named output governor pressure and which is applied on said drive changing means for another of the drive ratios in said second gearing.

52. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through one of said gearings between various drive ratios thereof, said last-named means including a governor driven by one of the rotary elements of the transmission mechanism and providing an output pressure that varies with the speed of said rotary element, and means operably connected with the other one of said gearings for providing a governor pressure effective on said automatic drive changing means for one of the drive ratios in said last-named gearing which is different with respect to a governor pressure effective for another drive ratio in said last-named gearing.

53. In a transmission; means having friction engaging means movable for engagement to establish a drive and for disengagement to disestablish said drive; retraction means operatively connected to said friction engaging means to move said friction engaging means for disengagement; hydraulic motor means for actuating said friction engaging means having a first and a second expansible chambers operably interconnected for common expansion and contraction and each chamber providing, on the supply of fluid under pressure to fill each chamber, a force acting on said friction engaging means for engagement; source means for providing fluid under substantially constant pressure; first conduit means for supplying fluid to said first chamber; second conduit means for supplying fluid to said second chamber; shift valve means for connecting said source means to supply fluid pressure from said source means substantially simultaneously to both said first and second conduit means for engagement of said friction engaging means and to connect both said first and second conduit means to exhaust for disengagement of said friction engaging means by said retraction means; and both of said conduit means and said chambers cooperating to provide a predetermined sequence in which said first conduit means freely connects said source means to said first chamber to supply fluid at a high volume flow under a substantially constant pressure to said first chamber to quickly provide a first force sufficient to overcome naid reaction means to move said friction engaging means to initially engage said friction engaging means with said first force permitting slip and to continue to apply said first force, and said second conduit means having a restriction for flow from said source to said second chamber to supply fluid at a low volume flow to said second chamber to gradually provide a second increasing force to finally apply said friction engaging means with both said first and second forces and providing free flow from said second chamber to said shift valve for exhaust for rapid disengagement of said friction engaging means.

References Cited by the Examiner

UNITED STATES PATENTS

| | | | |
|---|---|---|---|
| 2,578,308 | 12/1951 | Iavelli | 74—781 |
| 2,667,085 | 1/1954 | Ackerman | 74—645 |
| 2,683,997 | 7/1954 | Forster | 74—781 |
| 2,740,304 | 4/1956 | Sheppard | 74—472 |
| 2,761,328 | 9/1956 | Herndon et al. | 74—754 X |
| 2,766,639 | 10/1956 | Rosenberger | 74—472 |
| 2,770,148 | 11/1956 | Wayman | 74—472 |

DON A. WAITE, *Primary Examiner.*

SAMUEL SPINTMAN, BROUGHTON G. DURHAM,
*Examiners.*